US006672489B1

United States Patent
Huang

(10) Patent No.: US 6,672,489 B1
(45) Date of Patent: Jan. 6, 2004

(54) DISCHARGING DEVICE FOR A CAULKING GUN

(76) Inventor: Wu-Hsiung Huang, No. 7, Lane 25, Yu-Tsai St., Lukang Chen, Changhua Hsien (TW)

( * ) Notice: Subject to any disclaimer, the term of this patent is extended or adjusted under 35 U.S.C. 154(b) by 0 days.

(21) Appl. No.: 10/229,007

(22) Filed: Aug. 28, 2002

(51) Int. Cl.⁷ .............................................. G01F 11/00
(52) U.S. Cl. ...................................................... 222/391
(58) Field of Search ........................................ 222/391

(56) References Cited

U.S. PATENT DOCUMENTS

| 1,013,454 | A | * | 1/1912 | Sherbondy | 222/391 |
|---|---|---|---|---|---|
| 3,141,583 | A | * | 7/1964 | Mapel et al. | 222/391 |
| 3,193,146 | A | * | 7/1965 | Isgriggs et al. | 222/391 |
| 3,517,668 | A | * | 6/1970 | Brickson | 222/391 |
| 4,526,303 | A | * | 7/1985 | Harrod | 222/391 |
| 4,994,065 | A | * | 2/1991 | Gibbs et al. | 222/391 |
| 5,464,131 | A | * | 11/1995 | Keller | 222/391 |
| 5,755,362 | A | * | 5/1998 | Rodriguez et al. | 222/391 |
| 5,875,920 | A | * | 3/1999 | Parent | 222/391 |
| 5,992,694 | A | * | 11/1999 | Keller | 222/391 |
| 6,439,439 | B1 | * | 8/2002 | Rickard et al. | 222/391 |

* cited by examiner

*Primary Examiner*—Kenneth Bomberg
(74) *Attorney, Agent, or Firm*—Troxell Law Office PLLC

(57) ABSTRACT

A discharging device for a caulking gun with a ratchet push rod includes a body, a handle, a trigger, a pawl and a ratchet push rod. The ratchet push rod has a series of teeth and passes through the body from one end to the other. The pawl is pivotally mounted in the body to engage the ratchet push rod. Hence, the ratchet push rod moves forward when the trigger is pulled and moves slightly backward before the pawl engages the teeth when the trigger released. The backward movement reduces the residual pressure in the tube to prevent the discharge of caulking material in the tube when the discharging operation is halted.

4 Claims, 4 Drawing Sheets

DISCHARGING DEVICE FOR A CAULKING GUN

BACKGROUND OF THE INVENTION

1. Field of the Invention

The present invention relates to a discharging device, and more particularly to a discharging device for a caulking gun and having a ratchet push rod that will automatically move backward before the ratchet push rod is engaged with a pawl. The backward movement of the ratchet push rod prevents the continuous discharge of caulking material when a discharging operation is halted.

2. Description of Related Art

Caulking guns are widely used to fill spaces between pieces of wood or glass on a boat or around edges of windows with a special material such as silicon or caulking that keeps water out. A conventional discharging device for a caulking gun includes a body with a front end and a rear end. A handle is attached to the rear end of the body, and a ratchet push rod with a series of teeth passes through the body from the rear end to the front end. A trigger is attached to the body to repeatedly push the ratchet push rod forward to discharge caulking material such as silicon from a tube. A pawl is attached to the rear end of the body to prevent the ratchet push rod from being pushed back.

However, the conventional discharging device for a caulking gun only forces the ratchet push rod in one direction. Furthermore, when the caulking material in the tube is exhausted, the ratchet push rod must be rotated 180 degrees so the teeth of the ratchet push rod separate from the pawl. Thus, the ratchet push rod can be pulled back so the tube of caulking material can be replaced.

The conventional discharging device for a caulking gun has the following shortcomings.

First, when a discharging operation is halted, pressure remains on the caulking material in the tube, and the pressure is higher than ambient air pressure. Because of the two pressures are not equal, the caulking material such as silicon in the tube will continue to be discharged from the tube until the pressure in the tube is equal to the ambient air pressure.

Second, when users replace the tube, the ratchet push rod must be rotated to displace the teeth of the ratchet push rod away from the trigger and the pawl. However, the trigger and the pawl still press against the ratchet push rod, which will damage the ratchet push rod because friction is generated between the push rod and the trigger and the pawl.

The conventional discharging device moves the ratchet push rod a forward distance three to four times the pitch between the teeth of the ratchet push rod. The conventional discharging device only allows a very small backward movement of the ratchet push rod. The distance is not enough to relieve the residual pressure in the tube and equalize the internal pressure with the ambient air pressure so the material in the tube will continue to be discharged when the discharging operation is halted.

To overcome the shortcomings, the present invention provides an improved discharging device for a caulking gun with a ratchet push rod to mitigate and/or obviate the aforementioned problems.

SUMMARY OF THE INVENTION

The main objective of the invention is to provide an improved discharging device for a caulking gun with a ratchet push rod where the discharging device can prevent the discharge of caulking material when the discharging operation is halted.

Other objectives, advantages and novel features of the invention will become more apparent from the following detailed description when taken in conjunction with the accompanying drawings.

DETAILED DESCRIPTION OF PREFERRED EMBODIMENT

Figure 1:
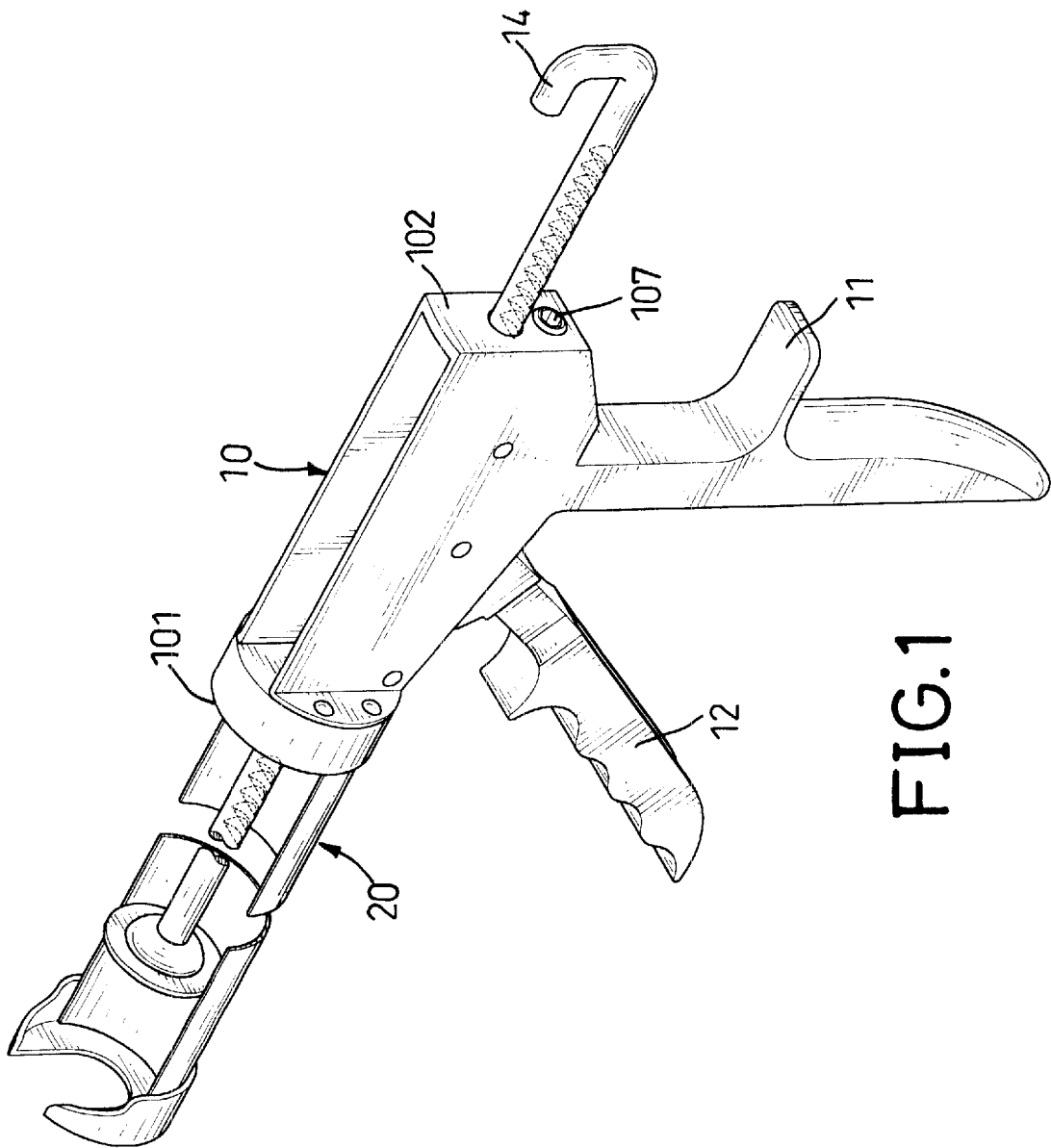
FIG. 1 is a perspective view of a caulking gun with a discharging device in accordance with the present invention.
Figure 2:
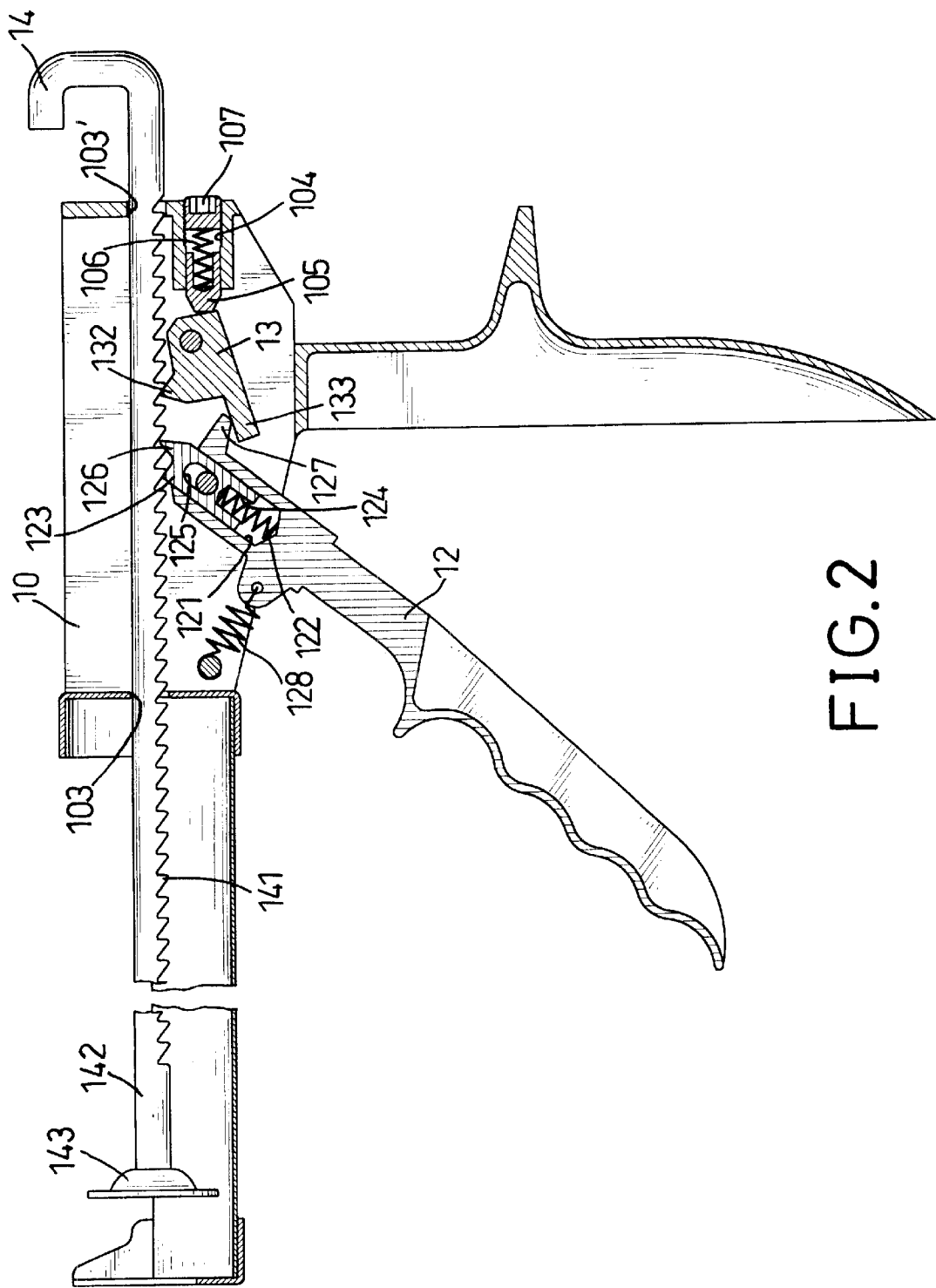
FIG. 2 is a side plan view in partial section of the caulking gun with the discharging device in FIG. 1.

With reference to FIGS. 1 and 2, a discharging device (not numbered) of a caulking gun (20) has a body (10), a handle (11), a trigger assembly, a pawl (13) and a ratchet push rod (14). The body (10) has a bottom (not numbered), a front end (101) and a rear end (102). Two through holes (103,103') are defined respectively in the front end (101) and the rear end (102). A screw hole (104) with an axis along the longitudinal axis of the body (10) is defined in the rear end (102) of the body (10).

The handle (11) extends from the bottom of the body (10) near the rear end (102) of the body (10). The ratchet push rod (14) has a front end (142) and a series of teeth (141). The front end (142) passes through the two through holes (103, 103') from the rear end (102) to the front end (101) of the body (10). The teeth (141) face the bottom of the body (10) and have a biased pitch (not numbered). A disk (143) is attached to the front end (142) of the ratchet push rod (14) to extend into and push one end of a tube (not shown) of caulking material such as silicon to force the caulking material from a nozzle (not shown) on the tube.

The trigger assembly comprises a trigger (12), a sliding block (123), a compression spring (122) and a tension spring (128). The trigger (12) is a lever with a front edge, a rear edge, a top end and a bottom end, is pivotally attached to the body (10) by a trigger pin (not numbered) and can be pivoted to abut the bottom of the front end (101) of the body (10). The trigger (12) has a guide hole (121) and a release lip (127). The guide hole (121) is defined in the top end of the trigger (12). The release lip (127) is formed on the rear edge at the top end of the trigger (12) facing the handle (11) perpendicular to the trigger (12). The compression spring (122) and the sliding block (123) are mounted in the guide hole (121).

The sliding block (123) has two ends, a blind hole (124), a drive tooth (126) and an elongated hole (125). The blind hole (124) is defined in one end to hold the compression spring (122). The drive tooth (126) is formed on the other end to engage the teeth (141) on the ratchet push rod (14). The elongated hole (125) is formed transversely through the sliding block (123), and the trigger pin passes through the elongated hole (125) and the guide hole (121) to hold the sliding block (123) in the guide hole (121). The drive tooth (126) pushes a tooth (141) on the ratchet push rod (14) to press the ratchet push rod (14) forward when the trigger (12) is squeezed toward the handle (11). The tension spring (128) has two ends (not numbered) and is connected between the front edge of the trigger (12) and the body (10).

Figure 3:
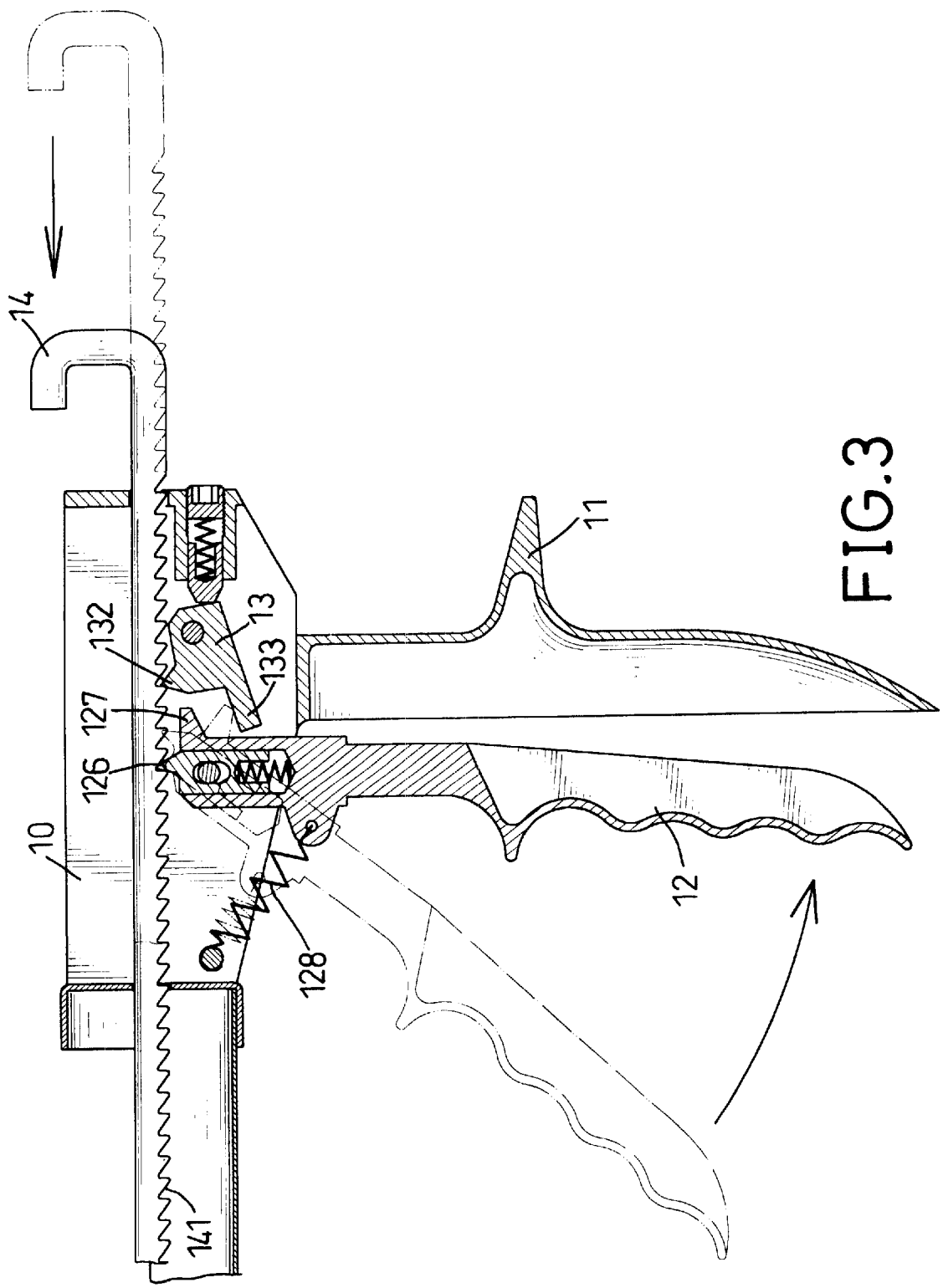
FIG. 3 is an operational side plan view in partial section of the discharging device in FIG. 1 when the trigger is pulled and the ratchet push rod is moved forward.

With further reference to FIG. 3, the drive tooth (126) engages and pushes one of the teeth (141) on the ratchet push rod (14) when the trigger (12) is squeezed toward the handle (11). The trigger (12) stretches the tension spring (128) that generates a restitution force on the trigger (12). When the drive tooth (126) abuts the teeth (141), the sliding block (123) is pressed into the guide hole (121), which compresses the compression spring (122). A reactive force is generated in the compression spring (122), which presses the sliding block (123). The drive tooth (126) firmly presses against and engages the teeth (141) on the ratchet push rod (14) so the ratchet push rod (14) can be pushed forward without having the drive tooth (126) disengage from the teeth (141).

When the trigger (12) is released, the force in the tension spring (128) pulls the trigger (12) away from the handle (11). Because of the elongated hole (125) in the sliding block (123), the trigger (12) can only push the ratchet push rod (14) forward a limited distance each time the trigger (12) is pulled. The distance the ratchet push rod (14) moves is one to two times the pitch between the teeth (141) on the ratchet push rod (14).

Figure 4:
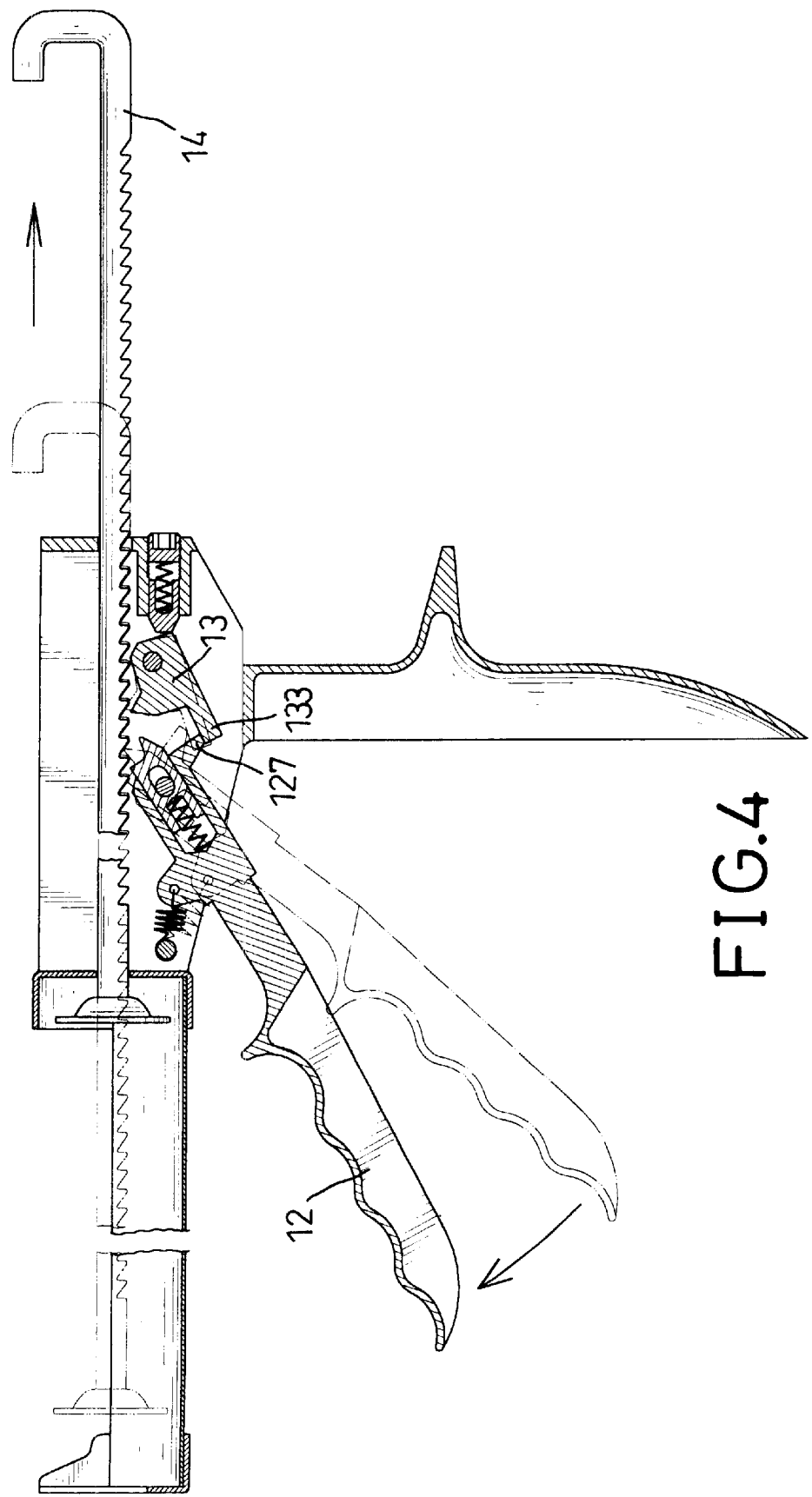
FIG. 4 is an operational side plan view in partial section of the discharging device in FIG. 1 when the trigger is pushed and the ratchet push rod can be pulled to replace a tube.

The pawl (13) includes a pawl tooth (132) and a pawl release (133) and is pivotally mounted on a pivot pin (131) in the body (10) to keep the ratchet push rod (14) from moving backward. The pawl tooth (132) is adapted to engage the teeth (141) on the ratchet push rod (14) and faces the teeth (141) on the ratchet push rod (14). The pawl release (133) is formed on the pawl (13) at a side (not numbered) facing the trigger (12) so the release lip (127) of the trigger (12) abuts the pawl release (133) when the trigger (12) is pulled forward by the tension spring (128). When the trigger (12) pushes the ratchet push rod (14) forward, the pawl tooth (132) slides along a tooth (141) and drops into a notch between the teeth (141) as the caulking material in the tube is discharged. With reference FIGS. 1 and 4, the release lip (127) presses the pawl release (133) down when the trigger (12) is pushed toward the front end (101) of the body (10). Both the drive tooth (126) and the pawl tooth (132) disengage from the teeth (141) of the ratchet push rod (14). Hence, the ratchet push rod (14) can be pulled backward to replace the tube.

The axis of the screw hole (104) is lower than the pivot pin (131) through the pawl (113). A biasing rod (105) has a blind hole (not numbered) and is slidably mounted in the screw hole (104). An adjusting screw (107) is screwed into the screw hole (104). A spring (106) is mounted in the blind hole in the biasing rod (105) and presses against the adjusting screw (107). The biasing rod (105) presses against the pawl (13), and the pawl tooth (132) engages the teeth (141) when the trigger (12) is released.

The discharging device as described has the following advantages.

First, the compression spring (122) mounted in the guide hole (121) between the trigger (12) and the sliding block (123) provides a constant force on the sliding block (123) when the sliding block (123) presses against the teeth (141). The force of the compression spring (122) keeps the drive tooth (126) engaged with the teeth (141) on the ratchet push rod (14).

Second, the trigger (12) and the pawl (13) are specially designed so the ratchet push rod (14) moves forward one to two times the pitch between the teeth (141) on the ratchet push rod (14) when the trigger (12) is squeezed once. When the trigger (12) is released, the ratchet push rod (14) moves backward a distance up to the pitch between the teeth (141) before the teeth (141) and the pawl tooth (132) are fully engaged with each other. This reduces the residual pressure in the tube and significantly reduces the discharge of caulking material from the tube when the discharging operation is halted.

Finally, when the trigger (12) is pushed toward the front end (101), the drive tooth (126) and the pawl tooth (132) are disengaged from the teeth (141) on the ratchet push rod (14). Hence, no friction exists between the ratchet push rod (14) and the drive or pawl elements when the ratchet pull rod (14) is pulled out of the empty tube in the caulking gun (20).

Even though numerous characteristics and advantages of the present invention have been set forth in the foregoing description, together with details of the device and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A discharging device for a caulking gun, the discharging device comprising:

a body with a bottom, a front end and a rear end and two through holes defined respectively in the front end and the rear end;

a handle formed at the bottom of the body;

a ratchet push rod with a front end and a series of teeth where the front end passes through the two through holes from the rear end to the front end of the body, and a disk mounted on the front end of the ratchet push rod;

a trigger pivotally attached to the body and having a top end, a front edge and a rear edge, the trigger comprising:

a guide hole defined in the top end of the trigger;

a compression spring mounted in the guide hole;

a sliding block pivotally mounted in the body, slidably mounted in the guide hole and abutting against the compression spring, a drive tooth adapted to push the teeth of the ratchet push rod and formed on the sliding block;

a release lip formed on the rear edge of the trigger, near the top end of the trigger and facing the handle; and a tension spring connected between the front edge of the trigger and the body;

a pawl pivotally mounted on a pivot pin in the body, a pawl tooth adapted to engage the teeth of the ratchet push rod and formed on the pawl, a pawl release formed on the pawl at a side facing the trigger and adapted to be pressed by the release lip of the trigger; and a biasing rod movably mounted in the body and abutting against the pawl to keep the pawl tooth engaging with the teeth on the ratchet push rod, wherein the pivot pin is at a position higher than that of the biasing rod.

2. The discharging device as claimed in claim 1, wherein the sliding block has a blind hole to receive the compression spring and an elongated hole transversely defined in the sliding block; and a trigger pin passes through the elongated hole in the sliding block and the guide hole in the trigger to pivotally hold the sliding block in the guide hole.

3. The discharging device as claimed in claim 1, where the body has a screw hole with an axis defined in the rear end of the body;

the biasing rod is slidably mounted in the screw hole;

a spring is received in the screw hole to push the biasing rod to abut against the pawl, and an adjusting screw is screwed into the screw hole and abuts against the spring.

4. The discharging device as claimed in claim 3, wherein the sliding block has a blind hole to receive the compression spring and an elongated hole transversely defined in the sliding block; and a trigger pin passes through the elongated hole in the sliding block and the guide hole in the trigger to pivotally hold the sliding block in the guide hole.

* * * * *